US005750198A

United States Patent [19]
Furuyama et al.

[11] Patent Number: 5,750,198
[45] Date of Patent: May 12, 1998

[54] COMPOSITION AND PROCESS FOR PREPAINTING TREATMENT OF PLASTICS

[75] Inventors: Osamu Furuyama, Yokohama; Kazunari Hamamura, Sagamihara; Masahiro Motozawa, Hiratsuka, all of Japan

[73] Assignee: Henkel Corporation, Plymouth Meeting, Pa.

[21] Appl. No.: 596,249

[22] PCT Filed: Aug. 9, 1994

[86] PCT No.: PCT/US94/08696

§ 371 Date: Feb. 12, 1996

§ 102(e) Date: Feb. 12, 1996

[87] PCT Pub. No.: WO95/04608

PCT Pub. Date: Feb. 16, 1995

[30] Foreign Application Priority Data

Aug. 11, 1993 [JP] Japan ................. 5-219176

[51] Int. Cl.⁶ ............................................. B05D 3/02
[52] U.S. Cl. ................. 427/322; 106/14.13; 427/393.5; 510/189; 510/242; 510/243; 510/488

[58] Field of Search ................. 106/14.13, 14.14; 427/306, 322, 397.5; 510/189, 242, 243, 488

[56] References Cited

U.S. PATENT DOCUMENTS

| 3,404,996 | 10/1968 | Deichert et al. | 117/47 |
| 3,481,763 | 12/1969 | Hider et al. | 117/60 |
| 3,993,575 | 11/1976 | Howanitz et al. | 510/434 |
| 5,167,992 | 12/1992 | Lin et al. | 427/437 |
| 5,248,525 | 9/1993 | Siebert | 427/337 |

FOREIGN PATENT DOCUMENTS

| 4 27472 | 1/1992 | Japan . |
| 5 39499 | 2/1993 | Japan . |

*Primary Examiner*—Michael Lusignan
*Attorney, Agent, or Firm*—Wayne C. Jaeschke; Norvell E. Wisdom, Jr.; Frank E. Robbins

[57] ABSTRACT

This invention relates to particular aqueous coating compositions comprising particular organic acids and processes of using these compositions to treat plastic moldings.

12 Claims, No Drawings

5,750,198

1

COMPOSITION AND PROCESS FOR PREPAINTING TREATMENT OF PLASTICS

TECHNICAL FIELD

The invention relates to a water-based liquid composition for treating plastics, particularly plastic moldings, more particularly those made of polypropylene, polyurethane, and the like, that are used, e.g., as body panels, bumpers, or the like in automobiles. The invention is especially suited to prepainting treatment of such plastics. The invention is accordingly described below primarily with reference to prepainting treatment for plastic moldings, but more generalized application to plastic surfaces is within the scope of the invention.

BACKGROUND ART

The plastic moldings used for automotive bumpers, etc., usually are currently manufactured by injection molding. In the case of resins that are prone to stick to the mold, such as polyurethane, the mold surface is usually coated prior to actual molding with a wax-based external release agent, and a metal soap (for example, zinc stearate), which functions as an internal release agent, is also frequently added to such resins in advance of molding. Various additives other than internal release agent often are also blended into resins for the purpose of improving the strength, improving paint adherence, improving the resistance to aging, and the like. As a result, during the molding process the strongly hydrophobic internal additives and of course any internal release agent bleed onto the surface to some degree. The presence on the surface of substances such as external release agent and bled-out internal additives impairs the post-painting adherence by the paint film and also causes paint crawling and thereby compromises the appearance of the paint film. The preparatory treatment that precedes painting must therefore not only remove contaminants adhering after molding, such as dust and oil, but must also remove substances such as external release agent and internal additives that have bled onto the surface.

The treatment of plastic moldings prior to painting has heretofore consisted mainly of the use of solvent cleaners such as 1,1,1-trichloroethane, freons, and the like. This type of treatment can dissolve and remove release agents and also has an excellent operating efficiency due to its ease of drying. However, as is well known, environmental considerations have made the development of substitute pretreatment methods a matter of urgency.

Cleaning with acidic and alkaline water-based cleaners and cleaning with emulsified solvent cleaners have been investigated as substitute pretreatment methods. These methods differ from solvent cleaning in that they require a rinse step and therefore require a drying step (see Japanese Laid Open Patent Application Numbers Hei 4-27472 [27, 472/1992] and Hei 5-39499 [39,499/1993]).

However, even after release agent on the surface has been removed by cleaning, drying must be conducted at low temperatures since internal release agent and strongly hydrophobic internal additives bleed onto the surface during the drying step. This lengthens the drying time and thus necessitates the use of large-scale equipment. In addition, since internal release agents and strongly hydrophobic internal additives gradually bleed onto the surface even at room temperature, the paintability also becomes impaired when a lengthy period of time is allowed to elapse between cleaning and painting. This requires that the cleaned molding be promptly painted.

2

As described above, research has heretofore focused on the removal of internal additives once they have bled onto the surface of the plastic molding from within the molding; however, up to now in the knowledge of the applicants there have been no investigations into the inhibition of bleed-out by internal additives onto the surface.

DISCLOSURE OF THE INVENTION

Problems to Be Solved by the Invention

The present invention is directed to an inhibition of the surface bleed by internal plastic additives that occurs with elapsed time and during the drying step in the interval after the water-based treatment of plastic moldings preparatory to their painting. More specifically, the present invention takes as its objects an increase in the drying temperature in order thereby to support equipment downsizing, an improvement in the paintability (e.g., paint crawling, paint adherence), and/or in particular a stabilization of the paintability through an inhibition of timewise changes in the paint-receiving surface.

SUMMARY OF THE INVENTION

The inventors discovered that treating the surface of a plastic molding with an aqueous solution containing specific organic acids results in an inhibition of the surface bleed by internal plastic additives and thus in an inhibition of timewise changes in the paint-receiving surface and a stabilization of the paintability. In specific terms, one embodiment of the present invention is a water-based liquid composition for treating plastic moldings prior to the painting thereof, wherein said composition is an aqueous solution that, in addition to water, comprises, preferably consists essentially of, or still more preferably consists of at least 0.05 weight % of at least one selection from carboxylic acids that do not contain any terminal alkyl group in their molecular structure and hydroxycarboxylic acids that do not contain any terminal alkyl group in their molecular structure; optionally, the compositions according to the invention may also contain surfactants, other builders, and or other acids. A process according to the invention includes at a minimum a step of contacting a plastic surface with a composition according to the invention as described herein.

DESCRIPTION OF PREFERRED EMBODIMENTS

The most important characteristic of the water-based composition or agent in accordance with the present invention for treating plastic moldings prior to their painting (hereinafter abbreviated as the prepaint treatment agent) is that said agent is an aqueous solution that contains as its essential component at least one selection from carboxylic acids that do not contain any terminal alkyl group in their molecular structure and hydroxycarboxylic acids that do not contain any terminal alkyl group in their molecular structure.

For the purposes of the present invention, the absence of any terminal alkyl group from the molecular structure means that no group having the formula —$C_nH_{2n+1}$ is present in the molecule.

Terminal alkyl-free carboxylic acids are specifically exemplified by oxalic acid, malonic acid, succinic acid, glutaric acid, and adipic acid.

Terminal alkyl-free hydroxycarboxylic acids are specifically exemplified by glycolic acid, malic acid, tartaric acid, and citric acid.

The aqueous solution preferably contains at least 0.05 weight % and more preferably at least 0.1 weight % of the one or more selections from terminal alkyl-free carboxylic acids and terminal alkyl-free hydroxycarboxylic acids. The surface bleed of internal additives from within the plastic molding usually is not adequately inhibited at below 0.05 weight %. Independently, for reasons of economy, the aqueous solution according to the invention preferably contains not more than 5, or more preferably not more than 2.2 weight % of these acids.

The aqueous solution in accordance with the present invention as described above (=aqueous solution that contains at least one selection from terminal alkyl-free carboxylic acids and terminal alkyl-free hydroxycarboxylic acids) functions to inhibit bleed-out by internal additives present in the plastic molding.

However, a surfactant normally must also be used to remove other contaminants, for example dust and oil, that adhere after molding. Said surfactant may be used in the prepaint treatment agent of the invention in combination with organic acid as specified above for the invention. Alternatively, contaminants such as dust and oil may first be removed using a solution that contains surfactant and treatment may then be carried out using a surfactant-free prepaint treatment agent in accordance with the invention.

No particular restrictions apply to the surfactant, and its type and quantity of use should be selected as a function of the particular conditions, such as the nature of the resin, the status of adhesion of the dust and oil, etc.

In addition to surfactant, the prepaint treatment agent of the invention may contain other builders.

Plastic moldings can be treated with the prepaint treatment agent of the invention by spraying or immersion. The bath temperature is not critical to the effect of the invention, i.e., the inhibition of bleed-out by internal additives. However, when surfactant is present in the prepaint treatment agent of the invention and this agent is relied on for general cleaning as well as for the inhibition of bleed-out, the temperature should be selected as a function of such considerations, generally known in the art, as the adhesion status of any oil, dust, or the like in order to accomplish their removal by the surfactant.

Treatment with the water-based pretreatment agent of the invention is believed to increase the surface free energy of plastic surfaces. This effect is not destroyed even by water washing after treatment and is not degraded by drying or by the passage of time after drying. It is thought that the inhibition of surface bleed by internal additives is caused by this increase in the surface free energy of the plastic surface. The organic acids specified for the present invention do not contain any terminal alkyl group in the molecule. In fact, however, terminal alkyl-containing organic acids do appear to produce an increase in the surface free energy immediately after treatment, but with these compounds the surface free energy is reduced by drying and by the elapse of time. It is for this reason that the use of alkyl-containing organic acids does not yield an adequate improvement in the paintability.

Moreover, the modification of surface properties as a result of execution of the prepaint treatment of the invention results in an improved wettability by aqueous solutions and thus in improved drying characteristics.

The invention and its benefits may be further appreciated by consideration of the following Examples (according to the invention) and Comparative Examples (not according to the invention).

Examples and Comparative Examples

1. Test materials amine-cured polyurethane (bumper material) external release agent: oxidized wax type internal release agent: zinc stearate hard polypropylene (bumper material)

2. Composition of the pretreatment agents

Pretreatment agent 1

(corresponds to a prepaint treatment agent of the invention)

| | |
|---|---|
| sulfuric acid: | 3 wt % |
| polyoxyethylene nonylphenyl ether | 0.5 wt % |
| organic acid | see Table 1 |
| water | remainder |

Pretreatment agent 2

(not a prepaint treatment agent of the invention)

| | |
|---|---|
| sulfuric acid | 3 wt % |
| polyoxyethylene nonylphenyl ether (HLB: 12) | 0.5 wt % |
| water | remainder |

Pretreatment agent 3

(corresponds to a prepaint treatment agent of the invention)

| | |
|---|---|
| organic acid | see Table 1 |
| water | remainder |

Pretreatment agent 4

(corresponds to a prepaint treatment agent of the invention)

| | |
|---|---|
| polyoxyethylene nonylphenyl ether (HLB: 12) | 0.5 wt % |
| organic acid | see Table 1 |
| water | remainder |

3. Treatment methods

Method A:

| | |
|---|---|
| treatment with pretreatment agent 1 | (180 sec, 80° C.) |
| ↓ | |
| water wash | (30 sec, ambient temperature) |
| ↓ | |
| wash with pure water | (30 sec, ambient temperature) |
| ↓ | |
| drain and dry | (10 min, 80° C. or 120° C.) |

Method B:

| | |
|---|---|
| treatment with pretreatment agent 2 | (180 sec, 80° C.) |
| ↓ | |
| water wash | (30 sec, ambient temperature) |
| ↓ | |
| treatment with pretreatment agent 3 | (10 sec, ambient temperature) |
| ↓ | |
| wash with pure water | (30 sec, ambient temperature) |
| ↓ | |
| drain and dry | (10 min, 80° C. or 120° C.) |

Method C:

| treatment with pretreatment agent 4 | (180 sec, 80° C.) |
| --- | --- |
| ↓ | |
| drain and dry | (10 min, 80° C. or 120° C.) |

(Spraying was used for treatment with the pretreatment agent and for the water washes.)

4. Painting

After pretreatment, the sample was held as specified below and then painted.

Holding conditions 1: painted within 12 hours after pretreatment.

Holding conditions 2: painted on the fifth day after pretreatment.

Primers:

In the case of the amine-cured polyurethane: Soflex® 1000 from Kansai Paint Kabushiki Kaisha, baking for 15 minutes at 110° C., film thickness=15 to 20 micrometers;

In the case of the hard polypropylene: Soflex® 2500 from Kansai Paint Kabushiki Kaisha, baking for 10 minutes at 100° C., film thickness=15 to 20 micrometers Top coat:

The following was used as the top coat for both sample materials: Soflex® 1200 from Kansai Paint Kabushiki Kaisha, baking for 20 minutes at 120° C., film thickness=35 to 40 micrometers.

5. Test methods used for evaluation (Contact angle)

After the execution of the pretreatment and drain and dry, or for other samples after completion of the holding period in addition, a drop of distilled water was placed on the surface of the sample and the contact angle was measured with a goniometer-type contact angle instrument. (The value measured immediately after drain and dry only is designated "initial" below.) Lower contact angles are indicative of lower interfacial energies between water and the treated solid surface and hence of better paintabilities.

(Adhesion after Water Soak)

After a holding period of 24 hours after painting, a checkerboard pattern of 100 squares, each 2 mm on a side, was cut in the paint surface using a sharp cutter. After an ensuing immersion for 240 hours in de-ionized water at 40° C., cellophane tape was applied to the checkerboard and then sharply peeled off and the number of residual paint film squares was counted. A larger number of residual squares is indicative of a better adhesion.

(Paint crawling test)

The appearance of the primer was visually evaluated after its application and was scored on the following three-level scale.

++: no primer crawling was observed

+: orange-peel crawling was observed x: crawling is observed to such a degree that the substrate has become visible The results of the performance evaluations are reported in Table 1, and these results support the following conclusions:

1. The contact angle, whether measured initially or after the holding period, was smaller and its variation was less in Examples 1 to 6 of the invention than in Comparative Examples 1 to 7. This was true even when high temperature paint-baking conditions were employed. The adhesion after water soak was excellent in Examples 1 to 6, and no paint crawling was observed in Examples 1 to 6. These excellent property values confirmed the inhibition of internal additive bleed from the plastic moldings.

2. In Examples 1 to 6 of the invention, the differences among treatment methods A, B, and C did not cause differences among the initial contact angle values, the timewise variation in the contact angle values, the adhesion after water soak, or paint crawling. This indicates that there is no difference between use of the surfactant in the prepaint treatment agent of the invention and preliminary treatment with a solution that contains only surfactant followed by treatment with surfactant-free prepaint treatment agent in accordance with the present invention.

TABLE 1

TEST VARIABLES AND RESULTS OF THE PERFORMANCE EVALUATIONS

| Pre-treat-ment Code | Organic Acid | | Initial Contact Angle in Degrees On: | | Drain/ Dry Temp., °C. | Holding Condition Code |
| --- | --- | --- | --- | --- | --- | --- |
| | Type | Conc. % | PU | PP | | |
| Ex. 1 | A | Succinic | 0.5 | 66 | 97 | 120 | 1 |
| Ex. 2 | B | Malic | 0.1 | 67 | 99 | 80 | 2 |
| Ex. 3 | C | Tartaric + Citric | 0.3 | 64 | 83 | 120 | 1 |
| Ex. 4 | C | Malonic | 1.0 | 65 | 85 | 80 | 2 |
| Ex. 5 | A | Oxalic | 0.05 | 68 | 100 | 120 | 1 |
| Ex. 6 | B | Citric | 2.0 | 65 | 99 | 120 | 1 |
| C.Ex. 1 | A | none | — | 82 | 98 | 120 | 1 |
| C.Ex. 2 | A | none | — | 83 | 101 | 80 | 2 |
| C.Ex. 3 | B | Malic | 0.03 | 80 | 99 | 120 | 1 |
| C.Ex. 4 | B | Tartaric | 0.01 | 79 | 98 | 80 | 2 |
| C.Ex. 5 | A | Methyl Succinic | 1.0 | 67 | 100 | 120 | 1 |
| C.Ex. 6 | B | Lactic | 2.0 | 68 | 98 | 120 | 1 |
| C.Ex. 7 | C | Acetic | 0.5 | 65 | 102 | 80 | 2 |

| | For Polyurethane: | | | For Polypropylene | | |
| --- | --- | --- | --- | --- | --- | --- |
| | Contact Angle, ° | Adhesion After Water Soak | Paint Crawl-ing | Contact Angle, ° | Adhesion After Water Soak | Paint Crawl-ing |
| Ex. 1 | 66 | 100 | ++ | 98 | 100 | ++ |
| Ex. 2 | 68 | 100 | ++ | 100 | 100 | ++ |
| Ex. 3 | 64 | 100 | ++ | 82 | 100 | ++ |
| Ex. 4 | 64 | 100 | ++ | 86 | 100 | ++ |
| Ex. 5 | 69 | 100 | ++ | 101 | 100 | ++ |
| Ex. 6 | 65 | 100 | ++ | 96 | 100 | ++ |
| C.Ex. 1 | 106 | 29 | X | 112 | 94 | + |
| C.Ex. 2 | 92 | 82 | + | 108 | 96 | + |
| C.Ex. 3 | 98 | 67 | X | 110 | 95 | + |
| C.Ex. 4 | 86 | 94 | + | 110 | 97 | + |
| C.Ex. 5 | 102 | 32 | X | 109 | 94 | + |
| C.Ex. 6 | 98 | 56 | X | 110 | 93 | + |
| C.Ex. 7 | 85 | 96 | + | 109 | 97 | + |

Notes for Table 1
"PU" = Polyurethane;
"PP" = Polypropylene;
"Ex." = [Working] Example;
"C.Ex." = Comparative Example
Values for contact angle in columns in which the words "Contact Angle" in the column heading are not immediately preceded by the word "Initial" were measured on the treated surfaces after pretreatment, followed by drain and dry and then followed by the holding period, but before painting the surface.

3. The values for the property set (initial contact angle value, timewise variation in the contact angle value, adhesion after water soak, and paint crawling) in Comparative Examples 1 and 2 (with no addition of organic acid) were inferior to those of Examples 1 to 6.

4. Comparative Examples 3 and 4 did employ terminal alkyl-free organic acids, but at concentrations of 0.01 to 0.03 weight %, or lower than the 0.05 to 2.0 weight % used in Examples 1 to 6. The values for the property set (initial contact angle value, timewise variation in the contact angle value, adhesion after water soak, and paint crawling) were again inferior. This indicates that 0.05 weight % is a critical organic acid concentration value with regard to the development of the effects of the invention.

5. Comparative Examples 5 to 7, which used terminal alkyl-containing organic acids, gave approximately the same initial contact angle values as Examples 1 to 6, but had inferior values for the timewise variation in the contact angle, adhesion after water soak, and paint crawling. This was true despite use of the terminal alkyl-containing organic acids at concentrations of 0.5 to 2.0 weight %.

Benefits of the Invention

The surface bleed of internal additives present in plastic moldings is inhibited by treatment with the water-based prepaint treatment agent in accordance with the present invention. This results in the following highly desirable effects: high-temperature drying becomes possible, which supports a shortening of the drying time and equipment downsizing; and changes in the surface with elapsed time are inhibited; this stabilizes the paintability and improves the workability.

The invention claimed is:

1. A process for treating a surface of a plastic material by contacting said surface, for a sufficient time at a sufficient temperature to decrease the spreading angle of water on said surface from the value of the spreading angle of water on said surface before such treating, with an aqueous solution consisting essentially of water and (A) a total of at least 0.05% by weight of one or more acids selected from the group consisting of carboxylic acids that do not contain any terminal alkyl group in their molecular structures, and hydroxycarboxylic acids that do not contain any terminal alkyl group in their molecular structures; and, optionally, one or more of (B) a component selected from acids that are not part of component (A) and (C) a component of surfactants not part of components (A) or (B);

said aqueous solution being free of an amount, sufficient to cause an initial increase in surface energy of the surface of plastic materials treated to be reduced by drying and elapse of time, of acid molecules that contain a terminal alkyl group in their molecular structures.

2. A process according to claim 1, wherein the plastic surface is that of an article produced by injection molding.

3. A process according to claim 2, wherein the amount of component (A) in the aqueous solution used for treatment is at least 0.1 weight %.

4. A process according to claim 1, wherein the amount of component (A) in the aqueous solution used for treatment is at least 0.1 weight %.

5. A process according to claim 4, wherein component (A) is selected from the group consisting of oxalic, malonic, succinic, glutaric, adipic, glyclolic, malic, tartaric, and citric acids.

6. A process according to claim 3, wherein component (A) is selected from the group consisting of oxalic, malonic, succinic, glutaric, adipic, glyclolic, malic, tartaric, and citric acids.

7. A process according to claim 2, wherein component (A) is selected from the group consisting of oxalic, malonic, succinic, glutaric, adipic, glyclolic, malic, tartaric, and citric acids.

8. A process according to claim 1, wherein component (A) is selected from the group consisting of oxalic, malonic, succinic, glutaric, adipic, glyclolic, malic, tartaric, and citric acids.

9. An aqueous solution, suitable for use as a prepainting treatment for a molded plastic surface, that consists essentially of water and:

(A) a total of at least 0.05% by weight of one or more acids selected from the group consisting of carboxylic acids that do not contain any terminal alkyl group in their molecular structures and hydroxycarboxylic acids that do not contain any terminal alkyl group in their molecular structures, and (B) a surfactant component not a part of component (A) and, optionally, (C) a component selected from acids that are not part of component A or component B, said aqueous solution being free of an amount, sufficient to cause an initial increase in surface energy of the surface of plastic materials treated to be reduced by drying and elapse of time, of acid molecules that contain a terminal alkyl group in their molecular structures.

10. An aqueous solution according to claim 9, wherein the amount of component (A) in the aqueous solution is at least 0.1 weight %.

11. An aqueous solution according to claim 10, wherein component (A) is selected from the group consisting of oxalic, malonic, succinic, glutaric, adipic, glyclolic, malic, tartaric, and citric acids.

12. An aqueous solution according to claim 9, wherein component (A) is selected from the group consisting of oxalic, malonic, succinic, glutaric, adipic, glyclolic, malic, tartaric, and citric acids.

* * * * *